United States Patent
Srinivasan et al.

(10) Patent No.: US 10,949,306 B2
(45) Date of Patent: Mar. 16, 2021

(54) SYSTEM AND METHOD OF A CLOUD SERVICE PROVIDER VIRTUAL MACHINE RECOVERY

(71) Applicant: Arista Networks, Inc., Santa Clara, CA (US)

(72) Inventors: Uday Sushilendra Srinivasan, Fremont, CA (US); Chaitanya Lala, Santa Clara, CA (US); Prasanna Panchamukhi, San Ramon, CA (US); Jayden Daniel Navarro, San Jose, CA (US); Rajagopalan Madapusi Ammanur, Los Altos, CA (US)

(73) Assignee: Arista Networks, Inc., Santa Clara, CA (US)

( * ) Notice: Subject to any disclaimer, the term of this patent is extended or adjusted under 35 U.S.C. 154(b) by 60 days.

(21) Appl. No.: 15/873,652

(22) Filed: Jan. 17, 2018

(65) Prior Publication Data
US 2019/0220359 A1    Jul. 18, 2019

(51) Int. Cl.
*G06F 11/00* (2006.01)
*G06F 11/14* (2006.01)
*G06F 13/40* (2006.01)
*G06F 9/455* (2018.01)
(Continued)

(52) U.S. Cl.
CPC ........ *G06F 11/142* (2013.01); *G06F 9/44505* (2013.01); *G06F 9/45558* (2013.01); *G06F 11/1464* (2013.01); *G06F 11/1484* (2013.01); *G06F 13/4081* (2013.01); *H04L 41/0654* (2013.01); *H04L 41/0866* (2013.01); *G06F 2009/45562* (2013.01); *G06F 2009/45579* (2013.01); *G06F 2009/45587* (2013.01); *G06F 2009/45595* (2013.01); *G06F 2201/815* (2013.01); *H04L 41/5096* (2013.01)

(58) Field of Classification Search
CPC . G06F 11/142; G06F 11/1484; G06F 9/45558
See application file for complete search history.

(56) References Cited

U.S. PATENT DOCUMENTS

| | | | |
|---|---|---|---|
| 8,677,358 B2 * | 3/2014 | Evans | H04W 4/60 718/1 |
| 8,954,963 B2 * | 2/2015 | Hattori | G06F 9/4411 718/1 |
| 9,710,338 B1 * | 7/2017 | Kumar | G06F 11/1469 |

(Continued)

FOREIGN PATENT DOCUMENTS

WO    2016056035 A1    4/2016

OTHER PUBLICATIONS

International Search Report and Written Opinion for PCT/US2018/068229 dated Apr. 24, 2019, 7 pages.

*Primary Examiner* — Elmira Mehrmanesh
(74) *Attorney, Agent, or Firm* — Fountainhead Law Group P.C.

(57) ABSTRACT

A method and apparatus of a device that recovers accessibility for an inaccessible virtual machine hosted by a cloud service provider is described. In an exemplary embodiment, the device receives an indication that a recovery disk has been attached to a virtual machine hosted by a cloud service provider, wherein the virtual machine is inaccessible to a client. In addition, the device executes an agent that recovers the accessibility of the virtual machine for the client.

20 Claims, 7 Drawing Sheets

(51) Int. Cl.
  *H04L 12/24*  (2006.01)
  *G06F 9/445*  (2018.01)

(56) References Cited

U.S. PATENT DOCUMENTS

| | | | | |
|---|---|---|---|---|
| 9,734,016 | B2* | 8/2017 | Tsirkin | G06F 11/1451 |
| 9,760,448 | B1* | 9/2017 | Per | G06F 11/1464 |
| 10,048,889 | B2* | 8/2018 | Dornemann | G06F 11/14 |
| 10,055,309 | B1* | 8/2018 | Samad | G06F 11/1464 |
| 10,061,660 | B1* | 8/2018 | Jagannatha | G06F 11/1469 |
| 10,120,764 | B1* | 11/2018 | Ramachandran | G06F 11/1464 |
| 10,318,335 | B1* | 6/2019 | Toy | G06N 5/022 |
| 2011/0167473 | A1 | 7/2011 | Evans et al. | |
| 2012/0174096 | A1* | 7/2012 | Conover | G06F 9/45558 718/1 |
| 2012/0324183 | A1* | 12/2012 | Chiruvolu | G06F 11/2038 711/162 |
| 2013/0263122 | A1 | 10/2013 | Levijarvi et al. | |
| 2014/0006858 | A1* | 1/2014 | Helfman | G06F 11/1448 714/19 |
| 2014/0059392 | A1 | 2/2014 | Ren et al. | |
| 2014/0089916 | A1* | 3/2014 | Gross | G06F 11/0712 718/1 |
| 2015/0012920 | A1* | 1/2015 | De Santis | G06F 9/45533 718/1 |
| 2015/0237132 | A1* | 8/2015 | Antony | H04L 67/1095 709/224 |
| 2016/0034359 | A1* | 2/2016 | Cabrera | G06F 11/1464 714/19 |
| 2016/0041880 | A1* | 2/2016 | Mitkar | G06F 11/1469 707/680 |
| 2016/0170848 | A1 | 6/2016 | Yang et al. | |
| 2017/0262347 | A1* | 9/2017 | Dornemann | G06F 9/45558 |

* cited by examiner

SYSTEM AND METHOD OF A CLOUD SERVICE PROVIDER VIRTUAL MACHINE RECOVERY

FIELD OF INVENTION

This invention relates generally to data networking, and more particularly, to a non-disruptive recovery a virtual machine of a cloud service provider.

BACKGROUND OF THE INVENTION

Cloud service providers, such as AMAZON WEB SERVICES (AWS) or MICROSOFT AZURE, typically only provide an Internet Protocol (IP) address based access to log into virtual machine (VM) hosted by the cloud service provider. This IP address is provided and configured via a bootstrap process which usually involves DHCP or something similar. The problem is that if the VM instance loses this IP address (e.g., due to a configuration error in the VM, in the cloud infrastructure, or the user simply forgets the password), there is no way to login to the VM to restore or recover this instance of the VM. The only way out of this situation is to destroy and redeploy a different instance, which has the risk of losing valuable data residing in the VM, or causing network downtime in the case of a virtual networking appliance VM. This is a persistent issue for cloud users who deploy and operate VMs on public clouds.

Current cloud service providers can offer a monitoring service which checks for a heartbeat from the VM and then indicates, via a management system, to determine whether this VM instance is active or not. The only VM recovery option is to destroy this VM instance and start a new one which is not what cloud customers like, especially if they have data to save off.

For example, AWS provides user specific data (user-data) which can be "added" to the VM during the launch/start of the VM via the portal. This user-data contains the sane configuration that can be passed to the VM, but this method requires the reboot or restart of the instance, hence it is a disruptive recovery mechanism. As another example, MICROSOFT AZURE has the ability to reset user password from Azure portal. The downside to this resetting of the password is that this requires IP connectivity in order to perform the reset.

In a further example, a VM can be recovered by disruptively stopping the VM, detach the VM Operating System disk image, mounting this disk image on a different VM to fix/analyze the bad configuration, re-attaching to the original VM and restart the original VM. This method has the downside that it requires manual intervention and failure mode inspection, which makes it unsuitable for use in large scale automation.

SUMMARY OF THE DESCRIPTION

A method and apparatus of a device that recovers accessibility for an inaccessible virtual machine hosted by a cloud service provider is described. In an exemplary embodiment, the device receives an indication that a recovery disk has been attached to a virtual machine hosted by a cloud service provider, wherein the virtual machine is inaccessible to a client. In addition, the device executes an agent that recovers the accessibility of the virtual machine for the client Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

A method and apparatus of a device that recovers accessibility for an inaccessible virtual machine hosted by a cloud service provider is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that recovers accessibility for an inaccessible virtual machine hosted by a cloud service provider is described. Current cloud service providers only offer a monitoring service which checks for a heartbeat from the virtual machine (VM) and then indicates via a management system if the instance is active or not. The only recovery option generally is to destroy this instance and start a new one. This may not be what cloud customers would like to do, especially if this customer has data to backup or save. In addition, there is no way to debug what went wrong or to recover the VM from a bad user configuration which may have caused the VM to lose connectivity or login access.

In one embodiment, the device attaches a recovery disk to the VM and triggers recovery using a configuration file residing on the recovery disk. This configuration file would instruct a recovery program on the recovery disk to perform a set of recovery (or debug) actions to bring the VM into a known good state. The result of the requested operations can either be seen on the log console provided by the cloud system or can be saved into a configurable location on the same virtual disk. The location of the logs/results file will also be configurable via the configuration file mentioned above. For example, status of the recovery operation, such as "disk attached", "snapshot taken, disk ready for detach" would be provided through console logs provided by the cloud service. In one embodiment, the recovery process of the VM using the agent is non-disruptive because the VM is not destroyed, restarted, or stopped during the recovery process. In this embodiment, the VM remains running during the agent operations to recover accessibility to the VM.

Figure 1:
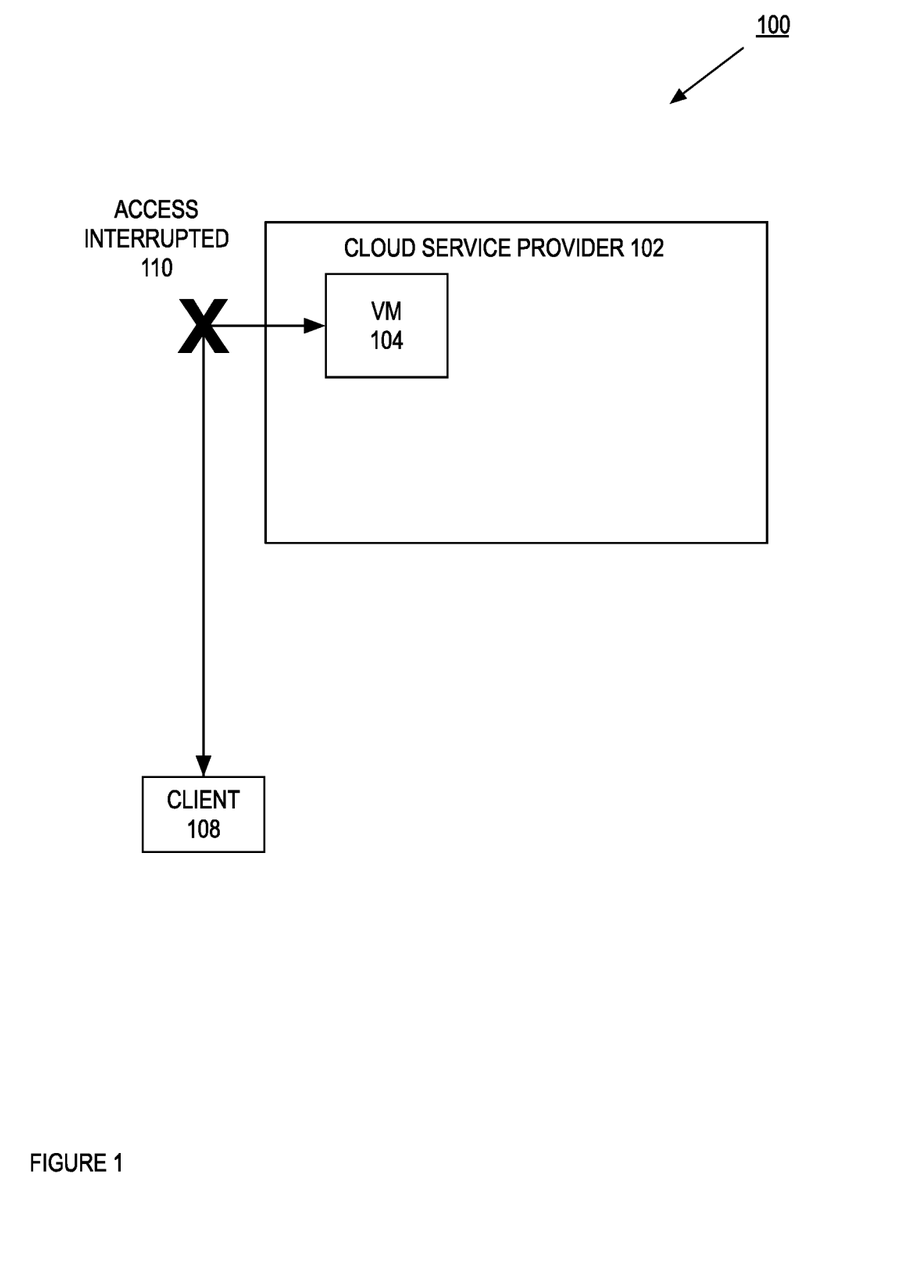
FIG. 1 is a block diagram of one embodiment of a system of client that has access interrupted to a virtual machine on a cloud service.

FIG. 1 is a block diagram of one embodiment of a system 100 of client that has access interrupted to a virtual machine on a cloud service. In FIG. 1, the system 100 includes a cloud service provider 102 coupled to a client 108. In one embodiment, a cloud service provider 102 is a service provider that provides different kinds of on-demand services for different customers using a shared poll of configurable computing resources (e.g., networks, servers, storage, applications, and other equipment and/or services). For example and in one embodiment, the cloud service provider 102 can be an AMAZON WEB SERVICES, IBM SMARTCLOUD, MICROSOFT AZURE, and/or any other type of cloud service provider. In one embodiment, the cloud service provider 102 can provide different services, such as infrastructure as a service (IaaS), platform as a service (PaaS), and software as a service (SaaS). In one embodiment, IaaS provides computers, network infrastructure, and/or storage, whether physical and/or virtual, to a customer. The customer will configure the provided IaaS with specific configurations and/or applications. In another embodiment, PaaS offers a development environment to application developers. The provider typically develops toolkit and standards for development and channels for distribution and payment. In the PaaS models, cloud providers deliver a computing platform, typically including operating system, programming-language execution environment, database, and web server. Application developers can develop and run their software solutions on a cloud platform without the cost and complexity of buying and managing the underlying hardware and software layers. In a further embodiment, SaaS provides on-demand applications and/or services to customers. For example and in one embodiment, SaaS has become a delivery model for many business applications, including office and messaging software, payroll processing software, DBMS software, management software, CAD software, development software, gamification, virtualization, accounting, collaboration, customer relationship management (CRM), management information systems (MIS), enterprise resource planning (ERP), invoicing, human resource management (HRM), talent acquisition, content management (CM), antivirus software, service desk management, and/or other types of applications and/or services. While in one embodiment, the system 100 is illustrated with one cloud service provider and one client, in alternate embodiments, there can be more or less cloud service providers and/or clients.

In one embodiment, the cloud service provider 102 includes a virtual machine 104 that is coupled to the client. In this embodiment, the virtual machine 104 is instantiated for the client to perform a service, such as one of the services (e.g., IaaS, PaaS, or SaaS) described above. In addition, the virtual machine 104 includes a virtual machine operating system. In one embodiment, while the client 108 accesses the virtual machine 104 for the service across a network (not illustrated), the client 108 can lose access to the virtual machine 104 (110). The lost access can be due a variety of possible reasons: a bad virtual machine configuration; bad virtual machine operating system; or that the user has lost or misplaced security credentials for the virtual machine 104 (e.g., lost login name, password, or key). Reason for inaccessibility is further described in FIG. 2 below.

Figure 2:
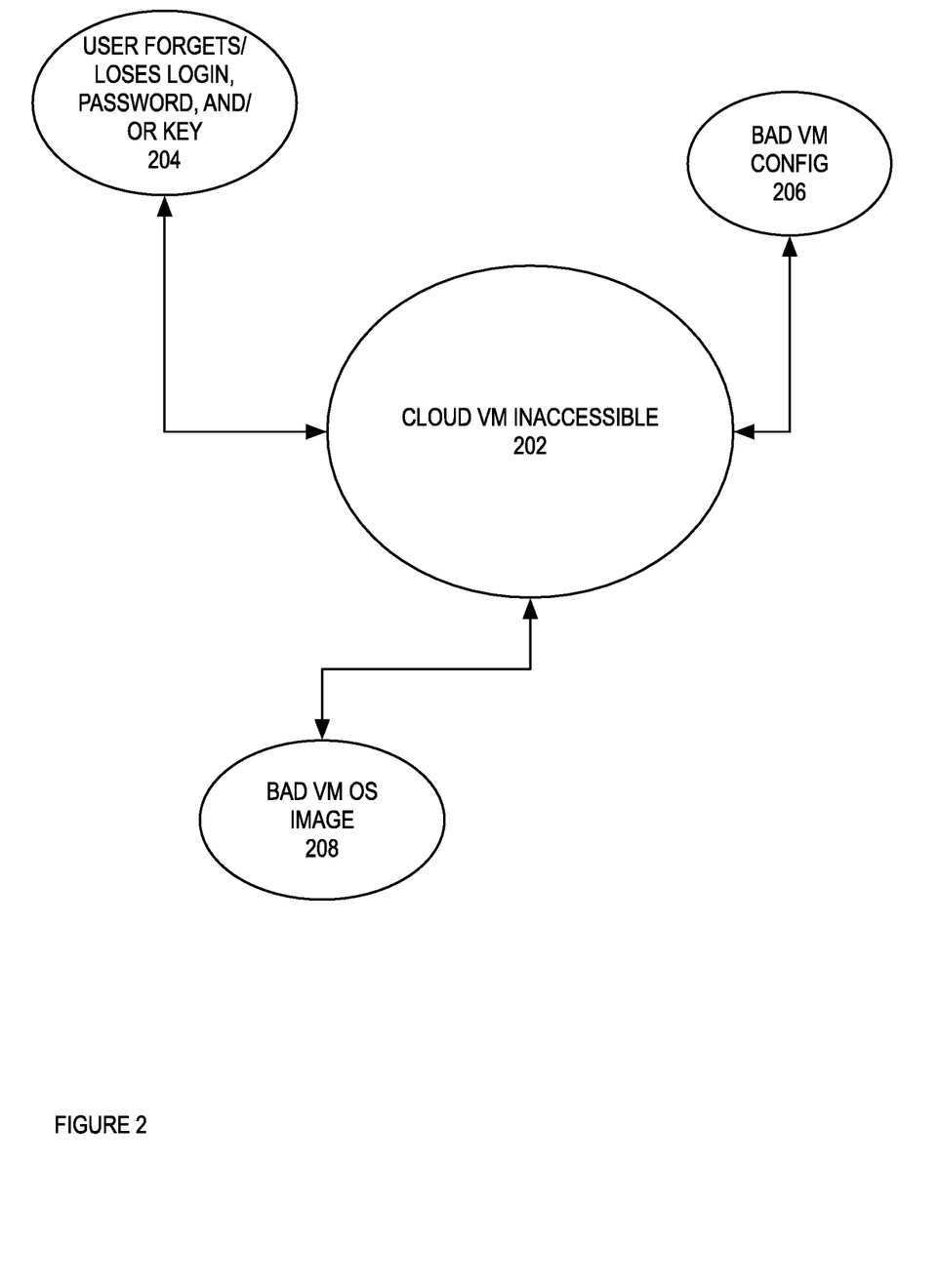
FIG. 2 is an illustration of one embodiment of a system of a client that has access restored to the virtual machine on a cloud service.

FIG. 2 is an illustration of one embodiment of possible reasons for a virtual machine being inaccessible. In FIG. 2, a virtual machine can be inaccessible for a variety of reasons. In one embodiment, a cloud virtual machine 202 can be inaccessible because: a bad virtual machine configuration 206; bad virtual machine operating system 208; or that the user has lost or misplaced security credentials 204 for the virtual machine 104 (e.g., lost login name, password, or key). In this embodiment, a bad virtual machine configuration can be due to: a configuration that does not have access to the network (e.g., misconfigured VM address), the configuration puts the VM in an inoperative state, the configuration triggers a bug in the VM, the VM is in an infinite loop, and/or other types of VM configuration issues. In another embodiment, a bad virtual machine operating system can be due to: the VM execution triggers a bug in the VM operating system, improper VM operating system configuration, unstable VM operating system image (e.g., a developmental image, such as an alpha or beta version) and/or another type of band virtual machine operating system. In one embodiment, a user can lose or misplace a credential used to login into or access to a VM. For example and in one embodiment, a user can lose a login name or other credential used to identify the user. Alternatively, the user can lose or forget a password for the VM accessible. In addition, the user can lose or misplace a key, certificate, or another type of credential (e.g., a secure shell (SSH) key).

Figure 3:
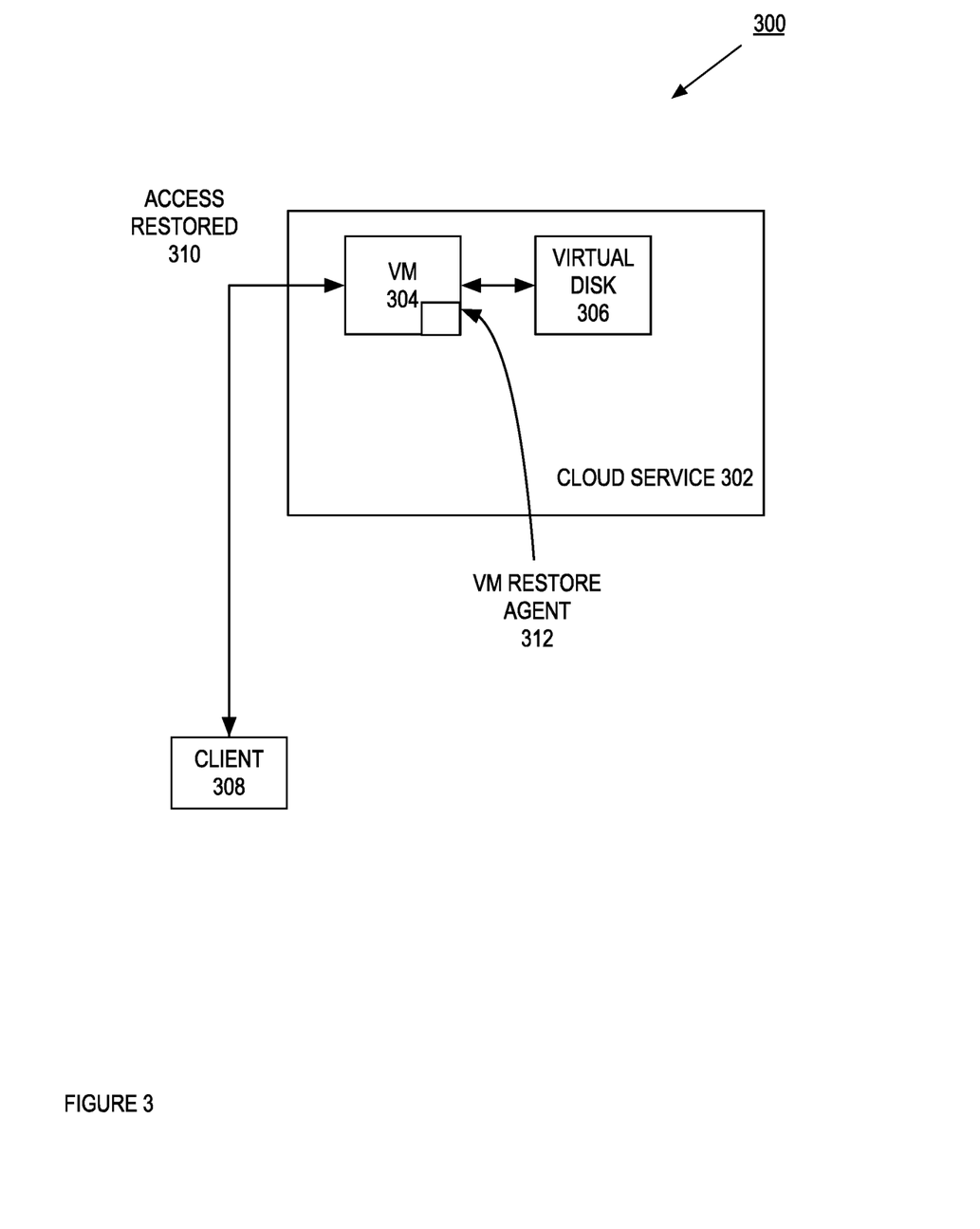
FIG. 3 is a block diagram of one embodiment of possible reasons for a virtual machine being inaccessible.

FIG. 3 is a block diagram of one embodiment of a system 300 of a client 308 that has access restored to the virtual machine on a cloud service. In FIG. 3, the client 308 is coupled to a VM 304 through a cloud service provider 302. In one embodiment, the client 308, VM 304, and cloud service provider 302 are the same or similar to the client 108, VM 104, and/or cloud service provider 102 as described in FIG. 1 above. As in FIG. 1, and in one embodiment, the client 308 has lost accessibility to the VM 304 for one or more of a variety of reasons. In this embodiment, the VM 304 can recover the accessibility for the client 308 by performing a recovery mechanism.

In one embodiment, the VM 304 can detect that the VM 304 is inaccessible. In one embodiment, a user can detect that a VM is inaccessible because the user cannot communicate with the VM or cannot login into the VM. Alternatively, the cloud service provider 302 can detect that the VM is unresponsive. In response to detecting the VM 304 is inaccessible, a virtual disk is attached to the VM 304. In one embodiment, the virtual disk 306 is configured from a physical disk with specific configuration information. In this embodiment, a filesystem can be mounted using the virtual disk. In addition, a VM restore agent 312 is instantiated for the VM 304 and the VM restore agent 312 performs one or more recovery actions in response to the virtual disk 306 being attached to the VM 304. In one embodiment, the VM restore agent 312 can perform simple instructions (e.g., copy VM logs or status to a well-known location) so that a user can recover and inspect the VM log or status). In one embodiment, the instructions the VM restore agent 312 can perform are instructions that can apply to multiple different types of VMs. In another embodiment, the VM restore agent 312 can execute a recovery program (not illustrated) that can execute instructions from a configuration file. In one embodiment, the recovery program can be a script, binary, an executable, text file, and/or another type of recovery program. In this embodiment, the recovery program can be located in the virtual disk or can be located in another location (e.g., shared disk shared with the hypervisor, or another location known to cloud service provider and the VM). In one embodiment, upon the agent completing execution, the virtual disk is detached.

Figure 4:
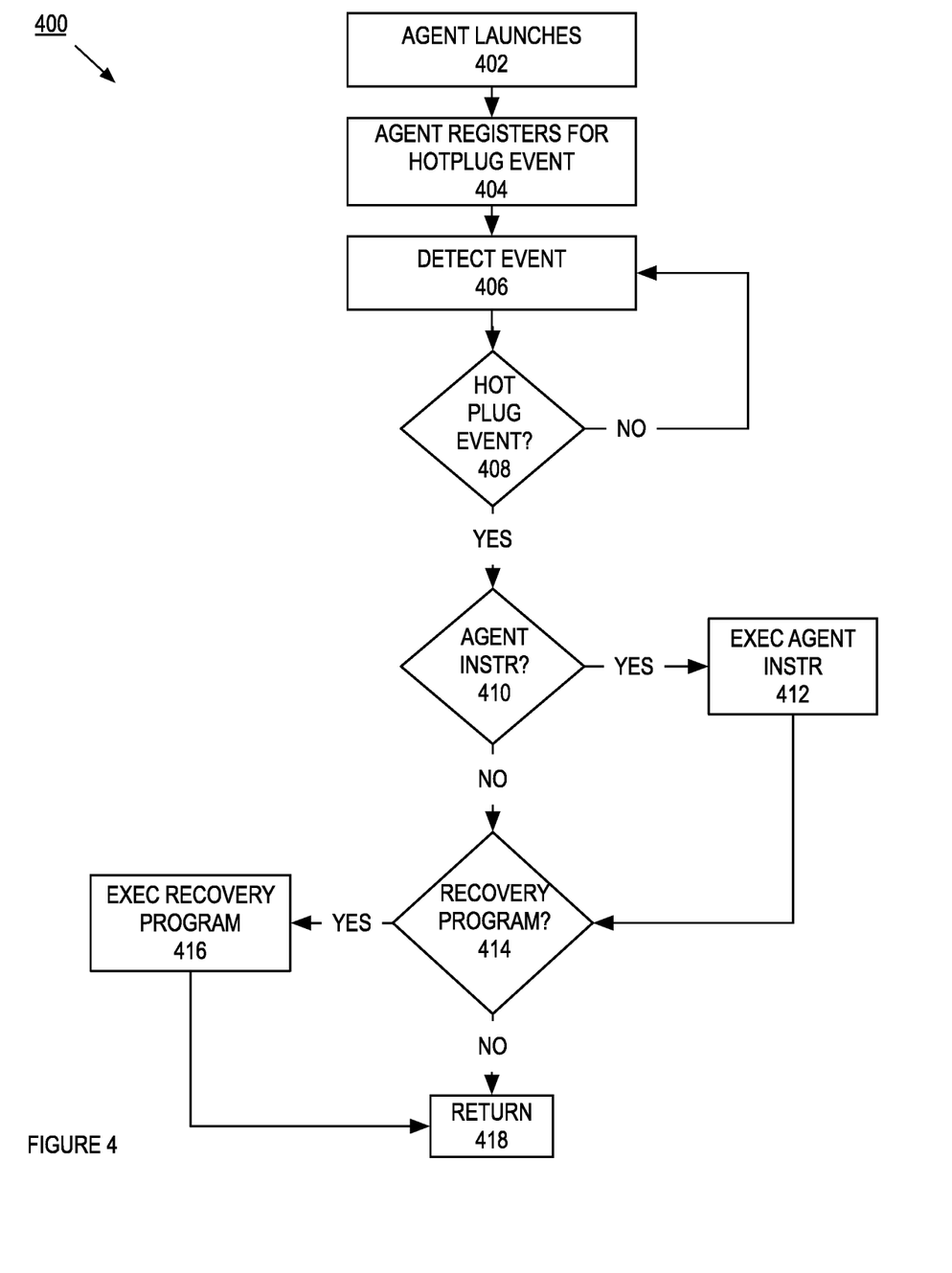
FIG. 4 is a flow diagram of one embodiment of a process to restore access to a virtual machine for a client.

As described above, in one embodiment, a VM is recovered using a VM recovery agent, recovery of the VM so that the client can regain accessibility to the VM. FIG. 4 is a flow diagram of one embodiment of a process 400 to restore access to a virtual machine for a client. In one embodiment, a VM perform process 400 to restore access to a virtual machine, such as the VM 304 as described in FIG. 3 above. In FIG. 4, process 400 begins by launching an agent at block 402. In one embodiment, the agent is launched when the VM is instantiated. At block 404, process 400 registers the agent for a hotplug event. In one embodiment, a hotplug event can occur when a storage media is attached to the VM. The storage media can be a virtual disk or some other type of storage media for a VM. In one embodiment, the storage media is a recovery disk that can include instructions to recover the VM when the VM is inaccessible.

At block 406, process 400 detects an event from the VM operating system. In one embodiment, the event can be a hotplug event or some other event. In this embodiment, the VM operating system signals the event to the processes that have registered for an event. Process 400 determines if the event is a hotplug event at block 408. In one embodiment, the hotplug event can result from a recovery disk being attached to the VM. If the event is not a hotplug event, execution proceeds to block 406 above.

If the event is a hotplug event, process 400 determines if the agent has instructions that the agent can process at block. In one embodiment, there can be two levels of instructions that are used to recover the VM. In this embodiment, there can be a set of instructions that the agent can execute and/or a set of instructions that a recovery program executes. For example and in one embodiment, the agent can perform one or more general instructions that the agent understands (e.g., copying logs to a known location that is accessible by a user) and a recovery program can execute instructions that are more varied and/or tailored to the particular VM that is inaccessible (e.g., generating a new SSH key for a user or resetting the login credentials). If there are agent instructions, the agent executes them at block 412. Execution proceeds to block 414 below. If there are not any agent instructions, execution proceeds to block 414 below.

At block 414, process 400 determines if there is a recovery program. In one embodiment, process 400 locates the recovery program using a well-known path where the recovery program is stored. In this embodiment, the recovery program parses a configuration file that is used by the recovery program. If there is a recovery program, process 400 executes the recovery program at block 416. Executing the recovery program is further described in FIG. 5 below. In one embodiment, process 400 can perform either the agent instructions or the recovery program, or can perform both. Execution proceeds to block 418 below. If there is not a recovery program, execution proceeds to block 418 below. At block 418, process 400 returns. In one embodiment, upon completion of process 400, the recovery disk is detached. In another embodiment, the agent detects completion of the recovery program (or the agent instructions, if the agent instructions complete the recovery of the VM). In this embodiment, the agent can log the recovery actions to a console upon completion.

Figure 5:
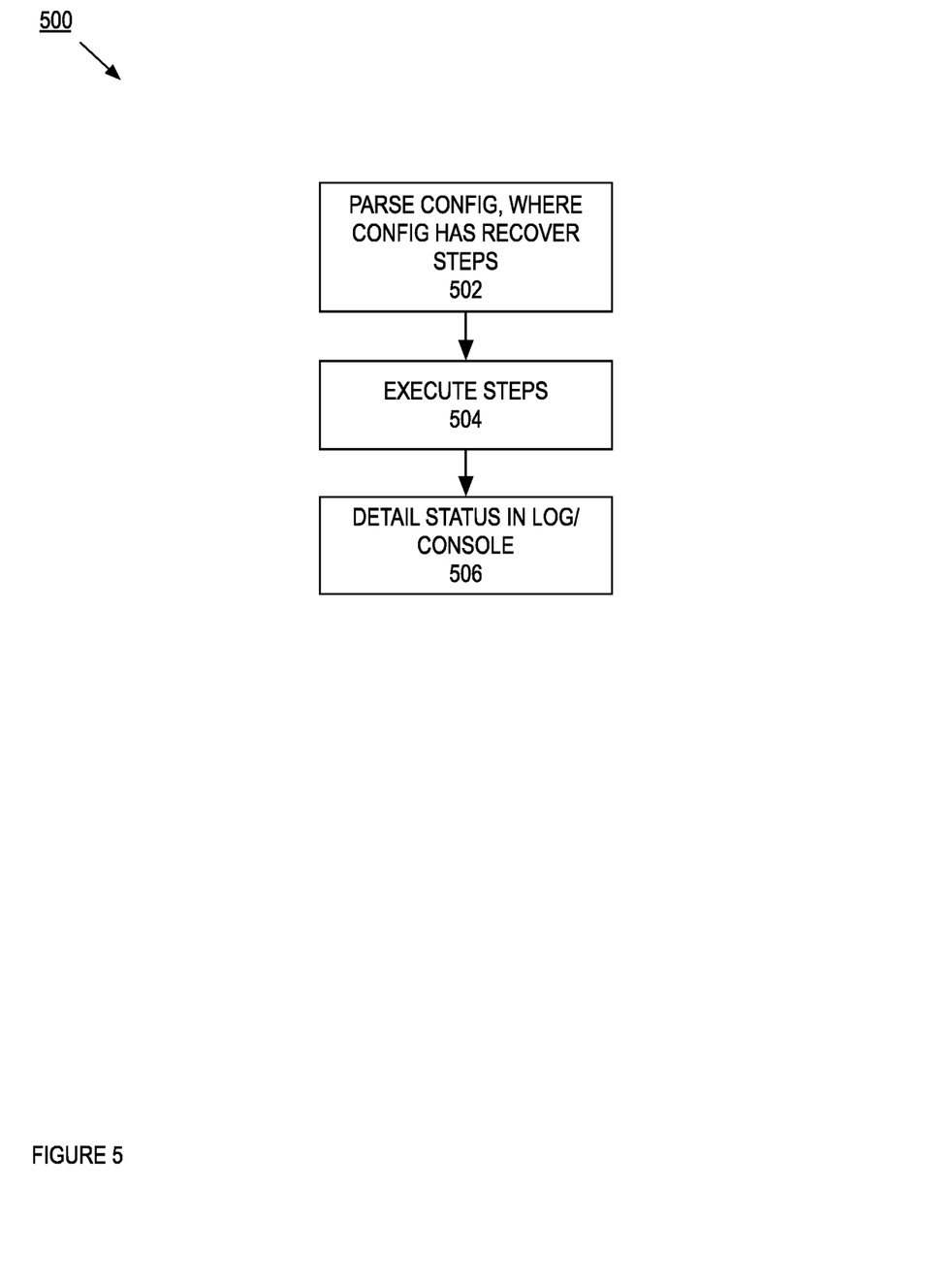
FIG. 5 is a flow diagram of one embodiment of a process to execute a configuration file.

FIG. 5 is a flow diagram of one embodiment of a process 500 to execute a configuration file. In one embodiment, process 500 is performed by an agent to execute a configuration file, such as the agent 314 as described in FIG. 3 above. In FIG. 5, process 500 begins by locating the configuration file at block 502. In one embodiment, process 500 parses the configuration file, where the configuration file has steps that define the step of recovery action(s) to be performed. In one embodiment, this configuration file will define steps to be performed in order to recover the instance. The configuration file will define a set of recovery actions, which could be chained in order to perform multiple actions. For example and in one embodiment, a recovery action could be to reset the password for a user and set the SSH key for the user. As another example, and embodiment, a recovery action could be to take a snapshot of the current or "running" settings/configuration of the VM and save it on the new disk. In one embodiment, the configuration file schema is flexible enough to take into account current and future recovery actions.

At block 504, process 500 executes the steps in the configuration file. Process 500 logs the steps, so that a user can view the steps taken and the results of the steps. In one embodiment, process 500 logs the steps to a log file, console, and/or another way to capture the results of the steps taken.

Figure 6:
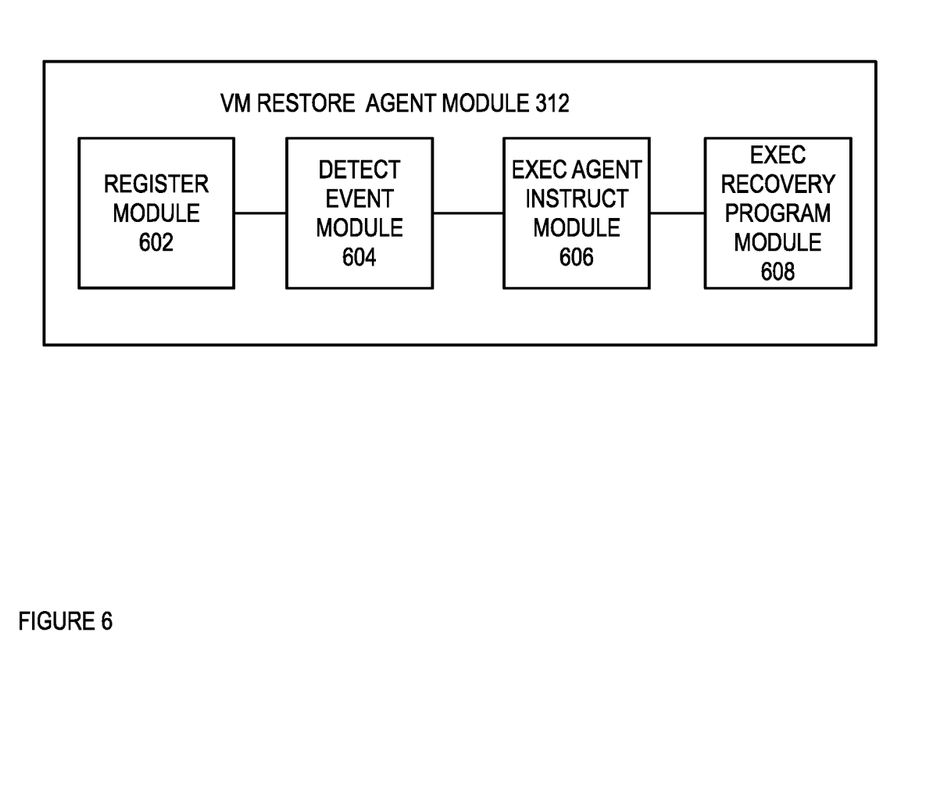
FIG. 6 is a block diagram of one embodiment of a restore module to restore access to a virtual machine for a client.

FIG. 6 is a block diagram of one embodiment of a VM restore agent 312 to restore access to a virtual machine for a client. In FIG. 6, the VM restore agent module 312 includes a register module 602, detect event module 604, execute agent instructions 606, and execute recovery program 608. In one embodiment, the register module 602 registers the agent as described in FIG. 4, block 402 above. The detect event module 604 detects a hotplug event as described in FIG. 4, block 404 above. The execute agent instructions module 606 executes the agent instructions as described in FIG. 4, block 412 above. The execute recovery program module 608 executes a recovery program as described in FIG. 4, block 416 above.

Figure 7:
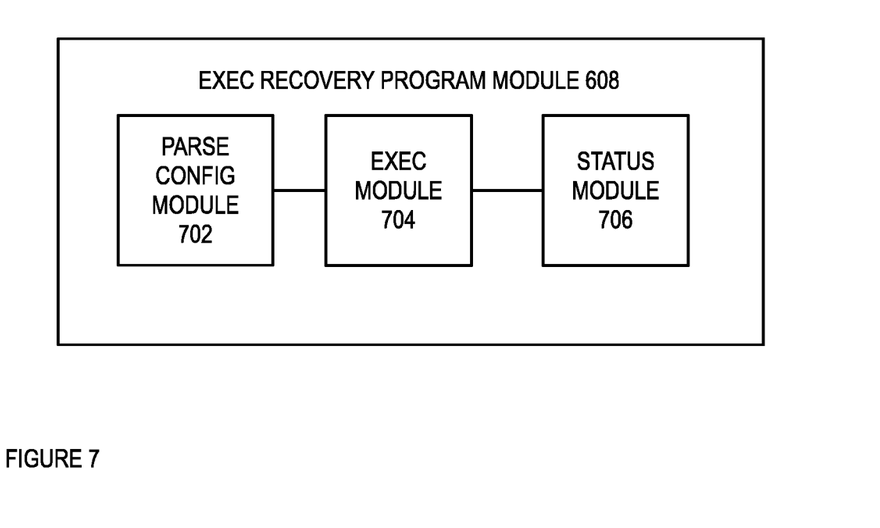
FIG. 7 is a block diagram of one embodiment of a virtual machine restore agent to execute a configuration file.

FIG. 7 is a block diagram of one embodiment of an execute recovery program module 608 to execute a configuration file. In one embodiment, the execute recovery program module 608 includes parse configuration module 702, execution module 704, and status module 706. In one embodiment, the parse configuration module 702 parse the configuration as described in FIG. 5, block 502 above. The execution module 704 executes the steps of the recovery program as described in FIG. 5, block 504 above. The status module 706 details the status as described in FIG. 5, block 506 above.

Figure 8:
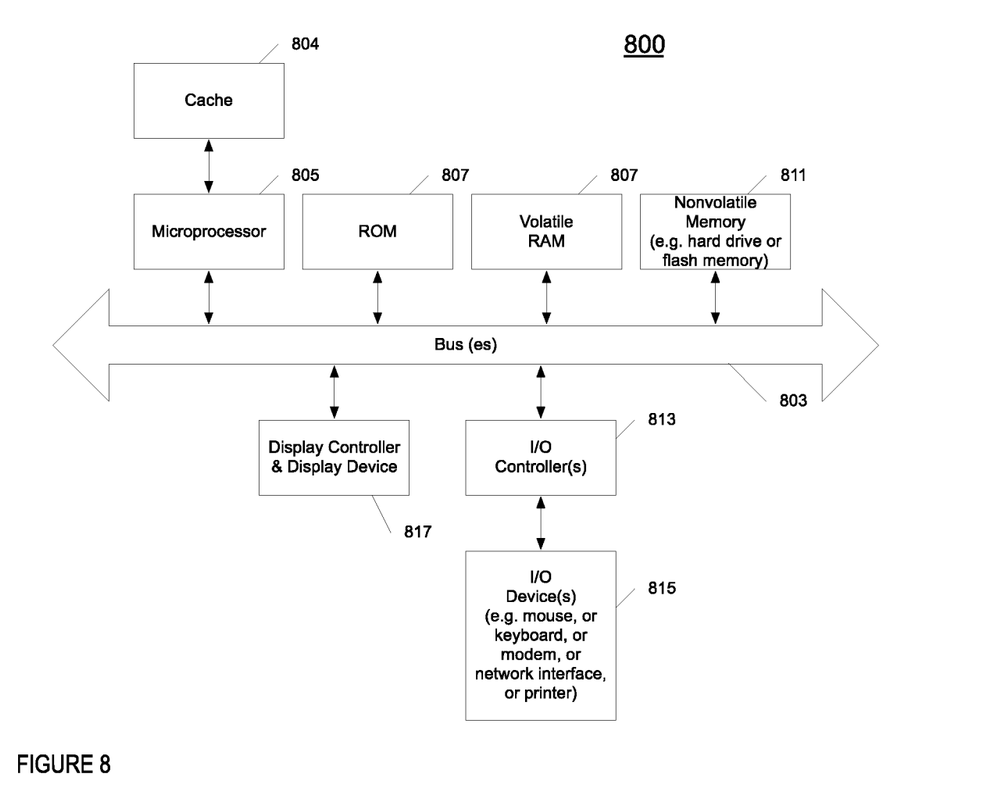
FIG. 8 illustrates one example of a typical computer system, which may be used in conjunction with the embodiments described herein.

FIG. 8 shows one example of a data processing system 800, which may be used with one embodiment of the present invention. Note that while FIG. 8 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 8, the computer system 800, which is a form of a data processing system, includes a bus 803 which is coupled to a microprocessor(s) 805 and a ROM (Read Only Memory) 807 and volatile RAM 809 and a non-volatile memory 811. The microprocessor 805 may retrieve the instructions from the memories 807, 809, 811 and execute the instructions to perform operations described above. The bus 803 interconnects these various components together and also interconnects these components 805, 807, 809, and 811 to a display controller and display device 817 and to peripheral devices such as input/output (I/O) devices which may be mice, keyboards, modems, network interfaces, printers and other devices which are well known in the art. In one embodiment, the system 800 includes a plurality of network interfaces of the same or different type (e.g., Ethernet copper interface, Ethernet fiber interfaces, wireless, and/or other types of network interfaces). In this embodiment, the system 800 can include a forwarding engine to forward network date received on one interface out another interface.

Typically, the input/output devices 815 are coupled to the system through input/output controllers 813. The volatile RAM (Random Access Memory) 809 is typically implemented as dynamic RAM (DRAM), which requires power continually in order to refresh or maintain the data in the memory.

The mass storage 811 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 811 will also be a random access memory although this is not required. While FIG. 8 shows that the mass storage 811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus, processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "detecting," "attaching," "mounting," "executing," "sending," "detaching," "inserting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method in a cloud service provider, the method comprising:
   instantiating a virtual machine on the cloud service provider to perform a service for a client, wherein the client initially has access to the virtual machine and subsequently loses access to the virtual machine;
   detecting that the instantiated virtual machine has become inaccessible to the client;
   attaching a recovery disk to the virtual machine in response to the virtual machine becoming inaccessible to the client;
   receiving an indication that a recovery disk has been attached to the virtual machine; and
   executing an agent on the virtual machine to recover the accessibility of the virtual machine for the client, including performing recovery actions in a configuration file stored on the recovery disk.

2. The non-transitory machine-readable medium of claim 1, wherein the indication is a hotplug event generated by an operating system of the virtual machine.

3. The non-transitory machine-readable medium of claim 1, wherein the agent is launched when the virtual machine is instantiated.

4. The non-transitory machine-readable medium of claim 1, wherein the agent can execute instructions known to the agent.

5. The non-transitory machine-readable medium of claim 1, wherein the agent can execute a recovery program.

6. The non-transitory machine-readable medium of claim 5, wherein the recovery program parses the configuration file.

7. The non-transitory machine-readable medium of claim 6, wherein the configuration file indicates one or more recovery actions.

8. The non-transitory machine-readable medium of claim 1, wherein the virtual machine is inaccessible to the client when the client cannot manage the virtual machine.

9. The non-transitory machine-readable medium of claim 1, the virtual machine can be inaccessible due to one or more of lost user credentials, a bad virtual machine configuration, and a bad virtual machine operating system image.

10. The non-transitory machine-readable medium of claim 1, wherein a cloud service provider is a service provider that provides different kinds of on-demand services for different customers using a shared poll of configurable computing resources.

11. The non-transitory machine-readable medium of claim 1, wherein the recovery disk is a virtual disk.

12. The non-transitory machine-readable medium of claim 1, further comprising:
    detecting the virtual machine recovery is complete; and
    detaching the recovery disk.

13. The non-transitory machine-readable medium of claim 12, further comprising:
    logging recovery status and detachment confirmation to a console.

14. A method in a cloud service provider, the method comprising:
    instantiating a virtual machine on the cloud service provider to perform a service for a client, wherein the client initially has access to the virtual machine and subsequently loses access to the virtual machine;
    detecting that the instantiated virtual machine has become inaccessible to the client;
    attaching a recovery disk to the virtual machine in response to the virtual machine becoming inaccessible to the client;
    receiving an indication that a recovery disk has been attached to the virtual machine; and
    executing an agent on the virtual machine to recover the accessibility of the virtual machine for the client, including performing recovery actions in a configuration file stored on the recovery disk.

15. The method of claim 14, wherein the indication is a hotplug event generated by an operating system of the virtual machine.

16. The method of claim 14, wherein the agent is launched when the virtual machine is instantiated.

17. The method of claim 14, wherein the agent can execute instructions known to the agent.

18. The method of claim 14, wherein the agent can execute a recovery program.

19. The method of claim 14, further comprising:
    detecting the virtual machine recovery is complete; and
    detaching the recovery disk.

20. The method of claim 19, further comprising:
    logging recovery status and detachment confirmation to a console.

* * * * *